July 23, 1929.  G. HOEPNER  1,721,909

WEIGHING AND BAG FILLING MACHINE

Filed June 18, 1927  5 Sheets-Sheet 1

Inventor:
George Hoepner

July 23, 1929. G. HOEPNER 1,721,909
WEIGHING AND BAG FILLING MACHINE
Filed June 18, 1927 5 Sheets-Sheet 2

Inventor:
George Hoepner

July 23, 1929.  G. HOEPNER  1,721,909
WEIGHING AND BAG FILLING MACHINE
Filed June 18, 1927   5 Sheets-Sheet 3

Inventor:
George Hoepner
By Wm F Freudenreich
Attys.

July 23, 1929. G. HOEPNER 1,721,909
WEIGHING AND BAG FILLING MACHINE
Filed June 18, 1927   5 Sheets-Sheet 4
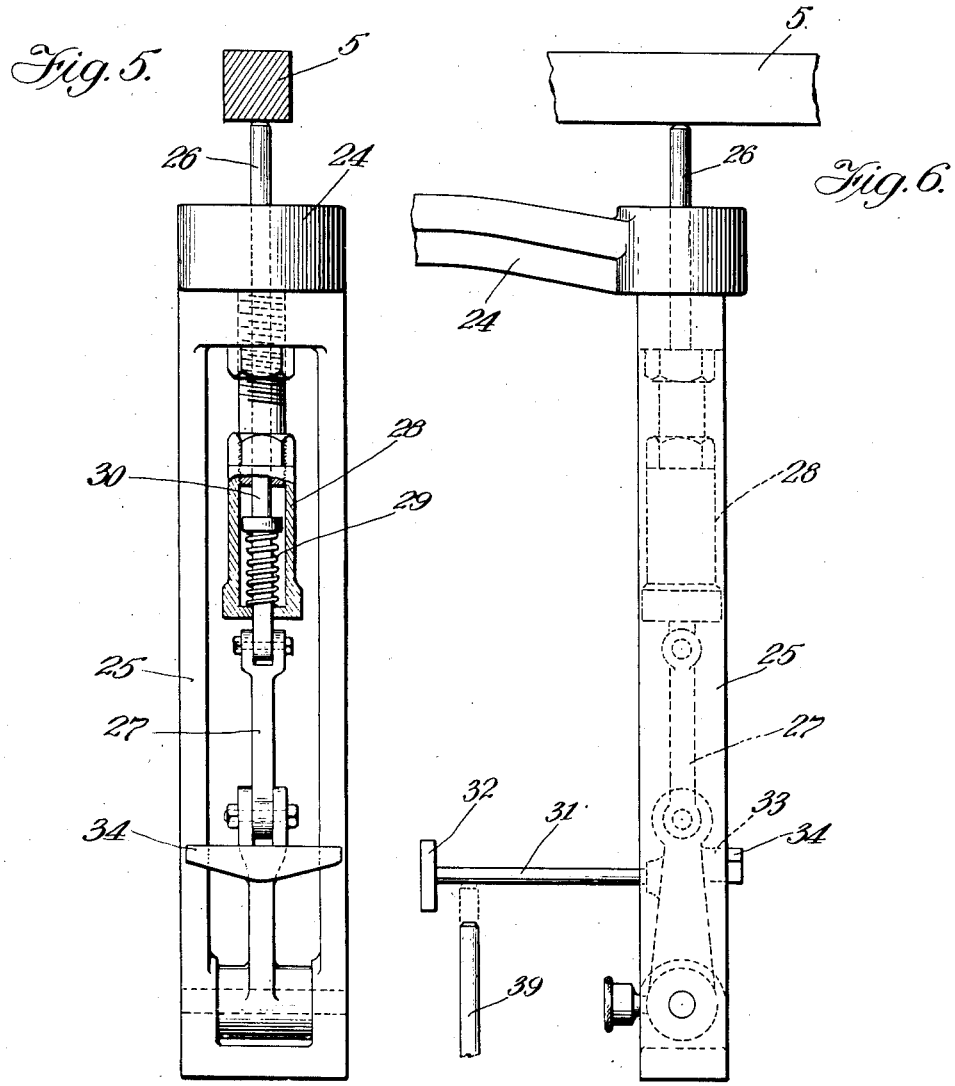

July 23, 1929.  G. HOEPNER  1,721,909
WEIGHING AND BAG FILLING MACHINE
Filed June 18, 1927    5 Sheets-Sheet 5
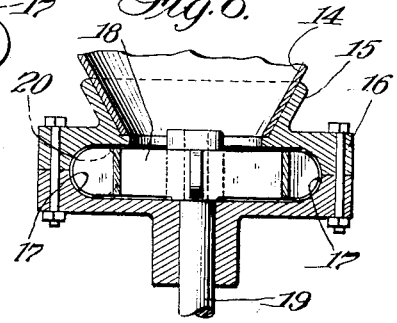
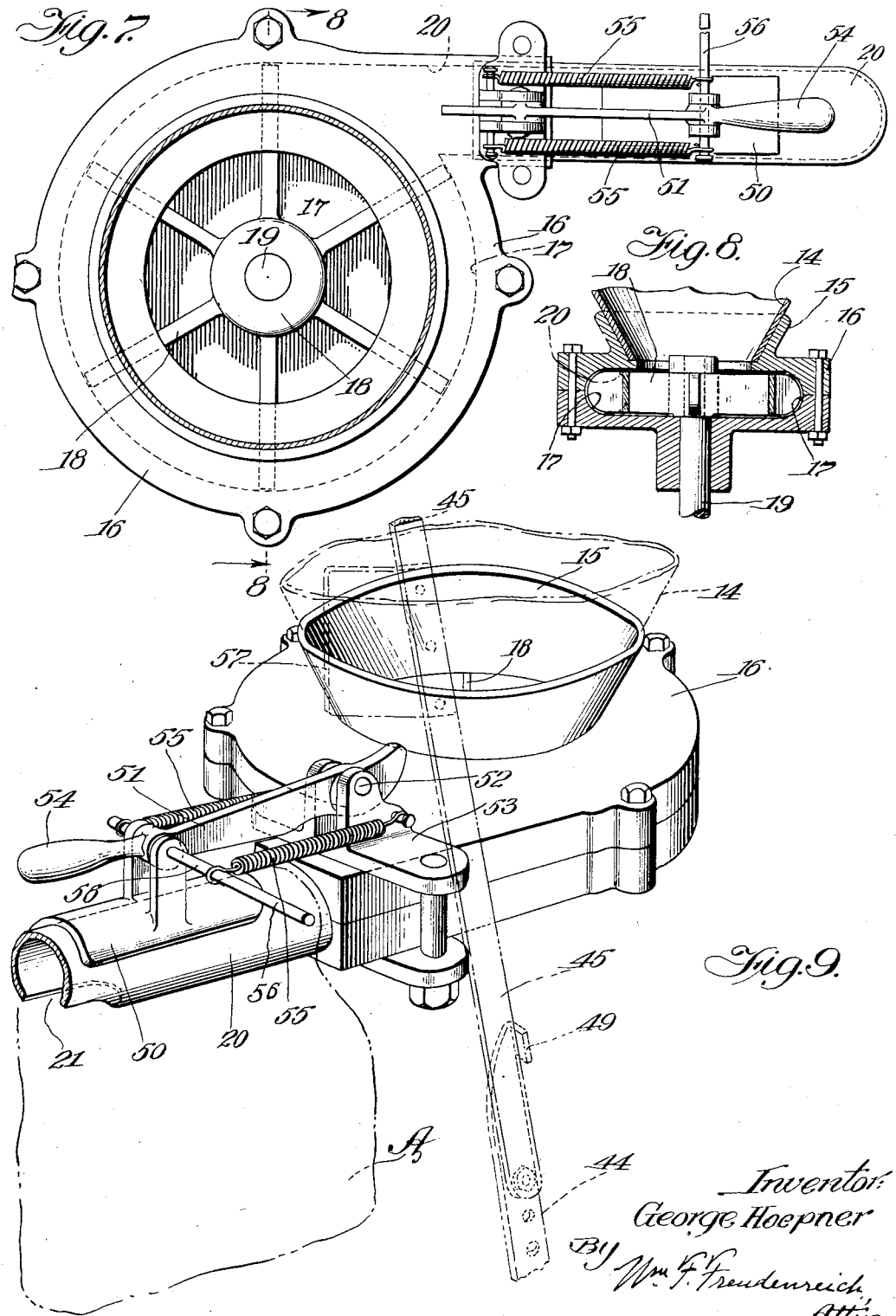
Inventor:
George Hoepner
By Wm. F. Freudenreich,
Attys.

Patented July 23, 1929.

1,721,909

UNITED STATES PATENT OFFICE.

GEORGE HOEPNER, OF CHICAGO, ILLINOIS, ASSIGNOR TO HOEPNER AUTOMATIC MACHINERY CORPORATION, OF BUFFALO, NEW YORK, A CORPORATION OF NEW YORK.

WEIGHING AND BAG-FILLING MACHINE.

Application filed June 18, 1927. Serial No. 199,700.

The present invention has for its object to make it possible accurately to weigh predetermined quantities of material and rapidly fill bags with the same.

My invention is particularly applicable to the weighing and packing of Portland cement and the like, and it may therefore be said to have for its object to make it possible rapidly to fill cement bags with accurately weighed quantities of cement.

Cement is usually packaged in bags adapted to contain ninety-six pounds of cement, a filled bag being therefore quite heavy. A further object of the present invention is to produce a simple and novel weighing and filling machine that will fill cement bags with accurately weighed amounts of cement and dispose of the filled bags without requiring the latter to be lifted or handled by the operator.

A further object of the present invention is to produce a novel weighing and bag filling machine that will take up very little floor space so that, if desired, a battery of such machines may be placed side by side and be within easy reach of a single operator.

The nature of cement is such that it does not flow easily. A further object of the present invention is to produce a simple and novel means for positively propelling a mass of cement into a bag after the mass has been discharged from a weighing bucket.

Figure 1:
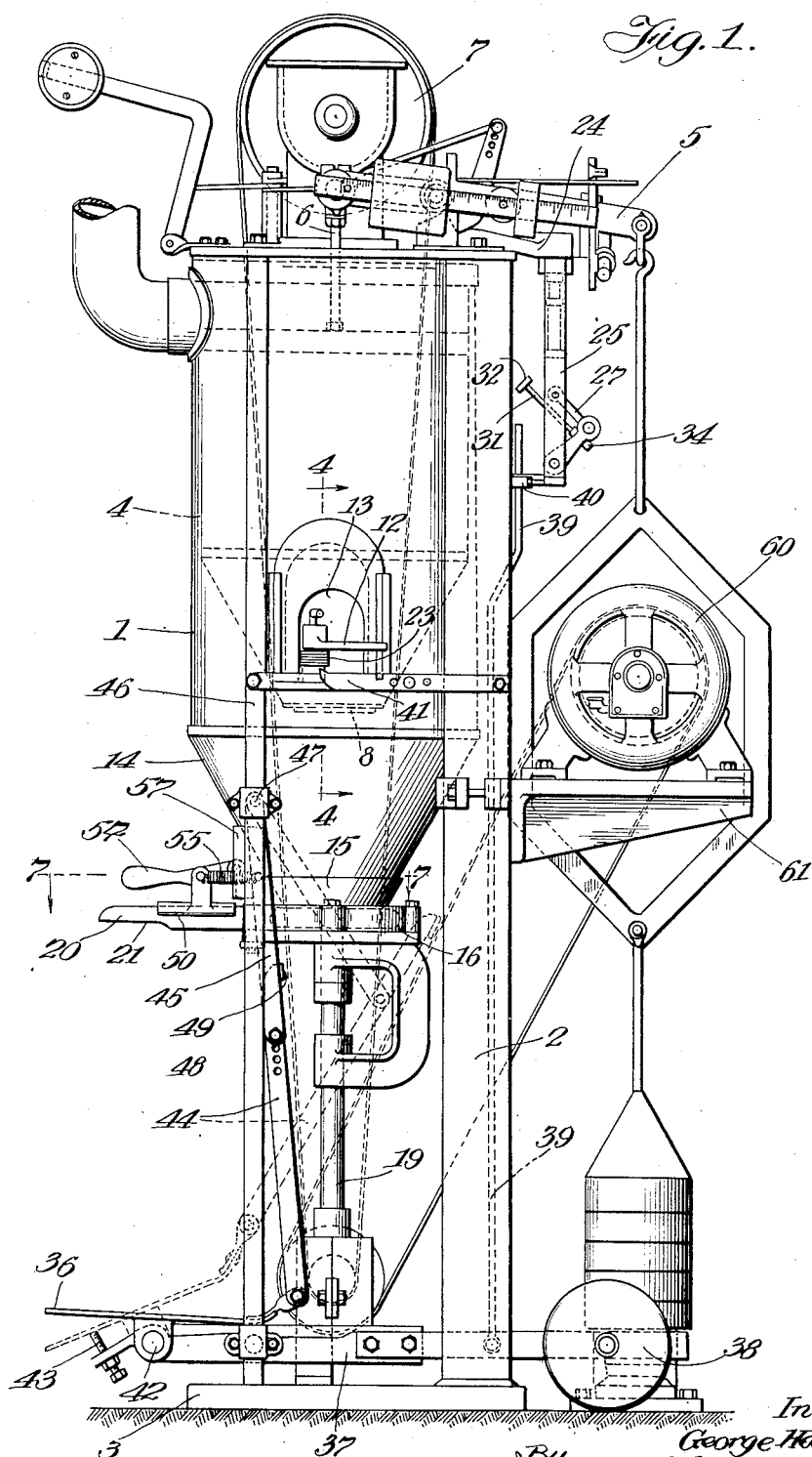
Figure 2:
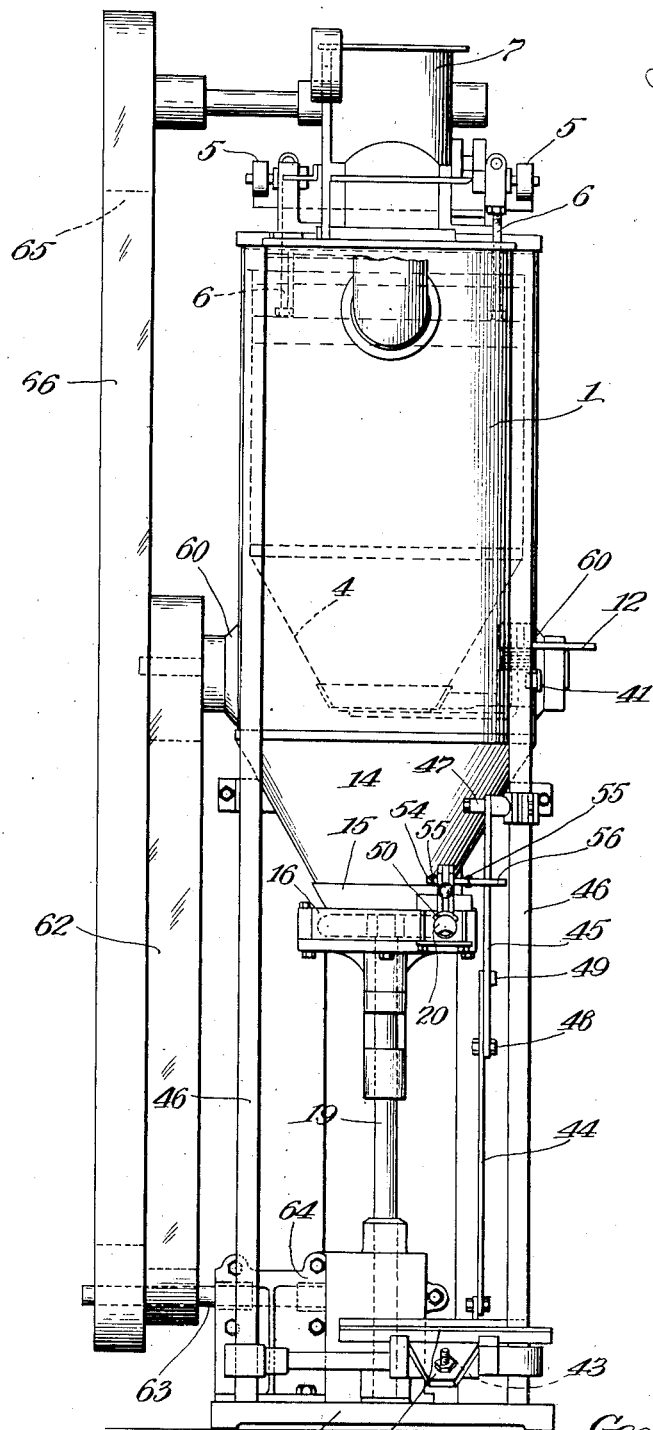
Figure 3:
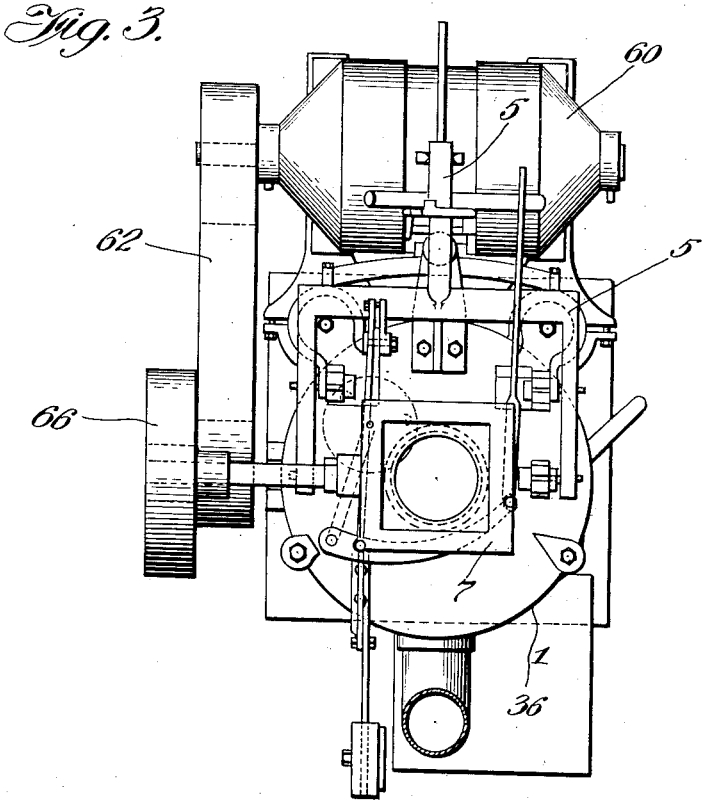
Figure 4:
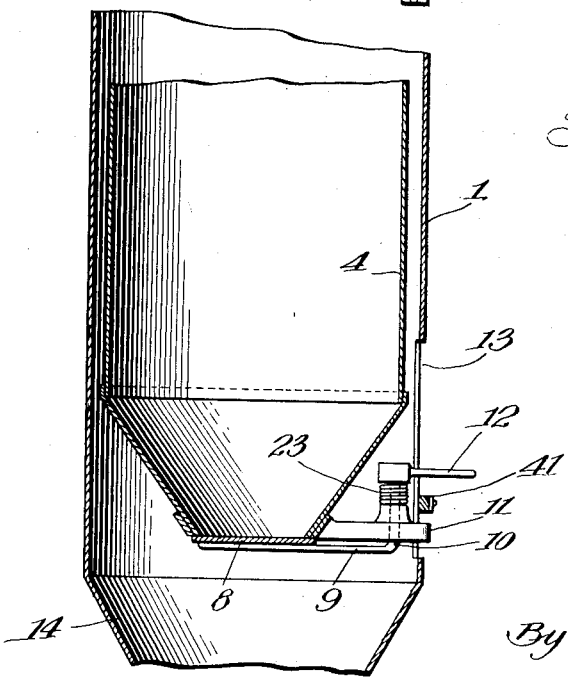

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a machine arranged in accordance with the present invention, the parts being in the weighing positions, and the bag support being shown in dotted lines in its dumping position; Fig. 2 is a front view of the machine; Fig. 3 is a top plan view; Fig. 4 is a section taken approximately on line 4—4 of Fig. 1, on a slightly larger scale than Fig. 1; Fig. 5 is a rear view of the scale beam locking mechanism in its locking position, a fragment of the spring housing being broken away; Fig. 6 is a side view of the scale beam locking mechanism; Fig. 7 is a section on an enlarged scale, on line 7—7 of Fig. 1; Fig. 8 is a section taken approximately on line 8—8 of Fig. 7, on a somewhat smaller scale than Fig. 7; and Fig. 9 is a perspective view of the bag clamping and material filling means.

Referring to the drawings, 1 represents a stationary receptacle mounted in an elevated position on a suitable supporting frame 2 rising from a base 3. Within the upper portion of the receptacle is a weighing bucket 4; this bucket being hung from a scale beam 5 by suitable rods 6. Above the bucket is a material delivery apparatus 7. The material delivery apparatus with its necessary gate, and the details of the weighing mechanism, of themselves form no part of the present invention, since any suitable mechanisms of this type may be employed.

The weighing bucket has a lower end in the form of a frustum of a cone to provide a central discharge outlet smaller in diameter than the diameter of the bucket. This discharge outlet is controlled by a gate 8 that may simply be a disc on the end of a swinging arm 9. In the arrangement shown, the outer end of this arm bent up as indicated at 10, in Fig. 4, and passes through a bracket 11 projecting laterally from the lower end of the bucket. On the upper end of the member 10 is a handle 12 extending out through an opening or window 13 in the side of the stationary receptacle 1. A torsion spring 23 surrounds the member 10 and is connected at its ends to the handle and to the bracket, respectively, so as to tend to hold the gate closed. The opening 13 in the stationary receptacle is of sufficient height to permit the handle 12 freely to rise and fall with the weighing bucket.

The lower end of the stationary receptacle is also in the form of a frustum of a cone, as indicated at 14. The extreme lower end of the conical part 14 fits into a conical neck 15 of large diameter rising from a horizontal fan housing 16 and forming the inlet into the fan chamber 17. Therefore, when the material is dumped from the weighing bucket, as will hereinafter be explained, it is discharged into a hopper-like container which in turn discharges directly into the horizontal fan chamber through a central opening so large that the cement cannot clog therein, but must flow into the fan chamber. In the fan chamber is a fan 18 provided with radial blades, the fan being fixed to the upper end of a vertical shaft 19 rising from the base of the machine. It will thus be seen that the cement is compelled to flow freely into the spaces between the fan blades. The outlet from the fan chamber is through a tangential conduit 20. In other words, the material enters the fan chamber at the axis and is discharged tangentially at the periphery. The conduit is made of considerable length, being preferably closed at its outer end, and open on the underside, as indicated at 21 in Fig. 9, along the outer half.

A bag to be filled, preferably of the type having a valved inlet in one corner, is slipped over the projecting conduit which may be said to form a discharge nozzle. Then, the weighing bucket having dumped a load, and the fan revolving rapidly, the cement is propelled through the nozzle and into the bag, rapidly filling the bag. It will be seen that the cement or other material is not permitted to clog any of the passages or openings because the discharge outlets from the bucket and the stationary receptacle are so large that no clogging can occur, whereas the fan positively drives the material into and through the discharge nozzle as it drops into the fan chamber.

The cycle of operation, namely the weighing of a charge, the dumping of the charge, the filling of a bag, and the disposal of the bag should be automatic, so that after a cycle has once been set in motion by some act of the operator, it will complete itself and place the mechanism in condition to be again started on a new cycle. Furthermore, in order to permit a maximum speed to be obtained, the weighing operation should not be required to await the completion of a bag filling operation. I have therefore provided means for automatically locking the weighing mechanism in an idle condition after a charge has been weighed, until a bag has been partially filled; whereupon the weighing mechanism is released and is permitted to weigh a second charge and be ready to dump it upon the removal of the previously filled bag and its replacement by an empty bag. I have also provided means for automatically dumping the filled bags from the machine, so as to make it unnecessary for the operator to lift or handle a filled bag.

As best shown in Figs. 1, 5 and 6, there is a bracket 24 projecting rearwardly from the top of the stationary frame of the machine, just below the rear end of the scale beam which rises whenever the bucket has been filled and descends. Depending from the outer end of the bracket 24 is a small frame 25. A vertical pin 26 is arranged within the frame 25 and extends upwardly through the top of the same and through the bracket in the plane of the swinging movement of the scale beam. Between the lower end of the pin or rod 26 and the lower end of the frame 25 is a toggle 27. When the toggle is straightened, as shown in Figs. 5 and 6, it holds the pin 26 projected above the bracket far enough to engage with the underside of the scale beam and lock it in its raised position, namely in the idle position of the weighing mechanism. The pin or rod 26 extends through a tubular guide 28 arranged in the upper part of the frame 25. In this guide is a compression spring 29 whose lower end rests on a shoulder on the guide 28, and whose upper end engages with a collar 30 on the pin or rod. Therefore, when free to do so, the spring forces the pin or rod 26 up and straightens the toggle. An arm 31 extends forwardly from the upper end of the lower link of the toggle for the purpose of tripping the lock for the scale beam. The arm 31 has a transverse head 32 on its free end, the width of the head being greater than the width of the opening in the frame 25; the head therefore serving as a limiting stop for movements in one direction. The lower link of the toggle also has a rearward projection 33, as best shown in Fig. 6, provided with a transverse head 34 that serves as a limiting stop when the toggle is straightened through the action of the spring.

The tripping of the locking mechanism is brought about by the filling of a bag. The bag to be filled, when hung on the nozzle 20, rests at its lower end on a platform 36 mounted on the forward end of a vertically swinging beam 37 provided at the rear end with a counterweight 38; the counterweight being preferably adjustable. A trip rod 39 rises from the rear end of the beam 37 and extends up to a point just beneath the trip arm 31; the upper end being held against lateral displacement by a guide bearing 40 on the frame of the machine. Normally the rear end of the swinging beam is held down by the counterweight, the trip rod lying below the trip finger, so that the scale mechanism is locked in an idle condition. To start the weighing mechanism, the trip finger may be raised as shown in Fig. 1, either directly, or by applying a downward pressure on the bag platform 36 so as to swing the beam 37 and raise the trip rod. As soon as the scale mechanism has been released, the bucket begins to fill and, when the proper charge has been weighed, the bucket drops, swinging the rear end of the scale beam up. The locking pin follows the scale beam in its upward movements until a point is reached where the toggle has become straightened. Assuming the fan to be running, and a bag to be positioned on the nozzle, the operator need only swing the controlling handle for the gate on the bucket, in order to cause the bucket to dump its charge into the bottom of the stationary receptacle, namely into the hopper for the fan. As soon as the load is dumped from the bucket, the fan begins to discharge it into the bag. When a predetermined quantity of material has entered the bag, the bag overbalances the counterweight 38 causing the rear end of the beam 37 to rise and push up the trip rod to cause the scale beam to be unlocked and permit the bucket to ascend and receive another charge. Therefore, the weighing of a second charge may begin before the first charge has been completely transferred to the bag.

The workman should not be required to hold open the gate on the weighing bucket until the entire charge has been dumped, and I have therefore provided means for locking the gate open after it has been opened, and permitting the gate to close only again when the bucket rises. To this end I have placed at the lower edge of the opening 13 in the stationary receptacle a horizontal pawl 41 lying in the path of the gate operating handle 12. When the filled bucket drops, the handle 12 strikes the pawl and depresses the latter slightly. Then, when the operator swings the handle in the direction to open the gate, the pawl snaps into position behind the handle, preventing the gate from returning to its closed position until the handle is released from the pawl. As soon as the bucket rises again, the handle for the gate is carried above the pawl, and therefore the spring 23 acts to close the gate before a new charge beings to enter the bucket.

The bag platform is pivotally supported on the beam 37, as indicated at 42, so as to be capable of swinging about a transverse horizontal axis. An adjustable stop 43 may be carried on the front end of the beam to limit the downward swinging movement of the front end of the platform. To the rear end of the platform is connected the lower end of a toggle device comprising a lower link 44 and an upper link 45; the upper end of the link 45 being pivoted to a stationary vertical frame member 46, as indicated at 47. The lower link extends upwardly past the pivot 48 between the links and has at its upper end an ear 49 adapted to strike against the rear edge of the upper link when the toggle is straightened, and prevent a swing past center. When the toggle is straightened, as it normally is, the bag platform is held against material tilting movements, although it will, of course, swing slightly about its pivot as the filled bag depresses the front end of the beam 37. However, if the toggle is broken as indicated in dotted lines in Fig. 1, the front end of the bag platform may swing down freely under the weight of a filled bag, permitting the bag to be automatically dumped therefrom.

Means are provided for breaking the toggle associated with the bag platform, after a bag has been filled. In order to avoid an extra operation or manipulation, this means is associated with the means for holding the bags on the nozzle. The cement leaves the nozzle with considerable force, and therefore if the bags are not fastened to the nozzle, they may be blown off. I have therefore provided a clamp that cooperates with the nozzle to hold the bags thereon. As best shown in Figs. 7 and 9, the clamp comprises a curved plate 50 adapted to fit over the nozzle and clamp the material of a bag A on the latter. The plate is hung from a lever 51 pivoted, as indicated at 52, to a bracket 53 fixed to or forming part of the fan casing. The lever is provided at its front end with a handle 54 for operating the same. On opposite sides of the lever, are springs 55 extending between the pivot pin 56 from which the clamping plate is suspended and the bracket 53. The springs are so disposed that when the clamping plate is down, they exert a force tending to hold it down whereas, when the lever is swung up to release a bag, the plane of the springs swings past the pivotal axis of the lever, thus locking the clamp in its open position. Since the unfastening of a bag from the nozzle and the dumping thereof from the platform should occur at substantially the same time, I make use of the clamp to trip the toggle that locks the bag platform. To this end, the pin 56 is made long enough and projects from one side of the operating handle the proper distance to cause the pin to strike the front edge of the upper link 45 of the toggle, or rather a forward extension 57 on this link. Therefore, when the handle of the clamp is thrown up, the bag is released and the bag platform is tripped, so that the bag will be dumped forward upon a suitable conveyor or other means for carrying it away.

Any suitable means may be provided for driving the power-driven mechanisms. In the arrangement shown, there is an electric motor 60 mounted on a bracket 61 arranged on the rear side of the machine about midway between the top and the bottom. A belt 62 extends from the motor to a horizontal shaft 63 at the bottom of the machine. The fan shaft 19 is driven from the shaft 63 through a suitable transmission 64; whereas the pulley 65 of the material delivery mechanism at the top of the machine is driven from the shaft 63 through a belt 66.

Although the operation of the machine will probably be fully understood from the preceding detailed description, I shall briefly review the same. The operator attaches a bag to the nozzle and trips the scale locking means. As soon as a charge has been weighed, the bucket descends and the operator swings over the gate lever, opening the gate of the bucket and causing the charge to be dumped. The fan rapidly drives the cement through the nozzle and into the bag. When the bag has received a predetermined part of its contents, say about one half, the bag platform is depressed and the tripping rod raised. Thereupon the weighted end of the scale beam drops and the empty bucket rises. As the bucket rises, the gate-operating handle is freed from the holding pawl and the gate closes. A new charge is weighed in the bucket which descends while the weighted end of the scale beam rises. In the meantime the bag has been filled and the operator has released it from the nozzle and caused it to be dumped by swinging up the clamp handle. As soon as a filled bag has been disposed of a new bag is clamped on the nozzle. Upon the dumping of the filled bag, the rear, weighted end of the bag-platform beam drops, allowing the scale beam lock to set itself under the rising scale beam and prevent the latter from dropping after the bucket has been dumped until a part of the charge has been delivered into the bag. The cycle may be repeated indefinitely, the operator's only tasks being the opening and closing of the clamp, the placing of bags on the nozzle and the throwing of the handle for the bucket gate during each cycle.

It will be seen that the machine is simple and compact, occupies very little floor space, and is automatic to such an extent that a battery of machines may be placed side by side and be operated by a single person. At the same time, each cycle of operation must be started by some act of the operator so that the machine cannot weigh and discharge material excepting under the proper conditions. Most important, however, is the fact that ordinary ninety-six pound cement bags may be filled very rapidly with an accurately weighed charge. Respecting the speed of filling bags, I may say that with my improved fan filling means it takes about a second and a half to fill a ninety-six pound bag of cement.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a machine of the character described, a weighing machine having a bucket, a container positioned below the bucket for receiving the contents of said bucket, a counterweighted support for a receptacle to be filled, filling means for delivering material from said container to such receptacle, means for locking the bucket in its lowered position, and means controlled by the said support for releasing the bucket from said locking means.

2. In a machine of the character described, a filling mechanism including a container, a weighing machine having a bucket located in the said container, said container having an opening through the side, a gate on said bucket, means tending constantly to close said gate, a handle for said gate extending through said opening, and a pawl on the container in position to engage with said handle and lock said gate open when the gate is opened while the bucket is in its lowermost position.

3. In a machine of the character described, a container having an opening in the side, a weighing machine having a bucket located in the container, a gate for said bucket, means tending constantly to close said gate, a horizontally-swinging handle for the gate projecting through said opening, and a vertically-swinging pawl on said container in position to drop behind said handle when the latter is swung into gate-opening position while the bucket is down and lock the gate open until the bucket again rises.

4. In a filling machine, a shallow horizontal fan casing having a large central inlet in the top and a small tangential outlet at the side, a discharge nozzle connected to said outlet, a rotatable fan element in said casing, a hopper rising above said casing around said inlet, a weighing machine having a bucket located above said hopper, and means controlled by the weighing machine to dump the bucket and discharge the contents of the latter into said hopper.

5. In a machine of the character described, a weighing machine including a bucket, a filling mechanism including a spout, a movable clamp for holding a bag on the spout, a swinging beam, a bag platform pivoted on one end of the beam, a counterweight on the other end of the beam, a locking device for the bucket, means associated with the beam for controlling the locking device, a locking means for holding the platform against tilting movements on the beam, and means associated with said clamp for controlling said locking means.

6. In a machine of the character described, a weighing machine including a bucket, a container for receiving the contents of the bucket, a filling means associated with said container, means for locking the emptied bucket down, a movable support for a receptacle to be filled by said filling means, said support being counterbalanced so as to be depressed when a predetermined portion of a charge has been delivered into the receptacle thereon, and means controlled by a lowering of the support to unlock the bucket.

In testimony whereof, I sign this specification.

GEORGE HOEPNER.